July 31, 1934.  J. E. NALL  1,968,702
HYDRAULIC BRAKE SAFETY DEVICE
Filed June 20, 1932   2 Sheets-Sheet 1
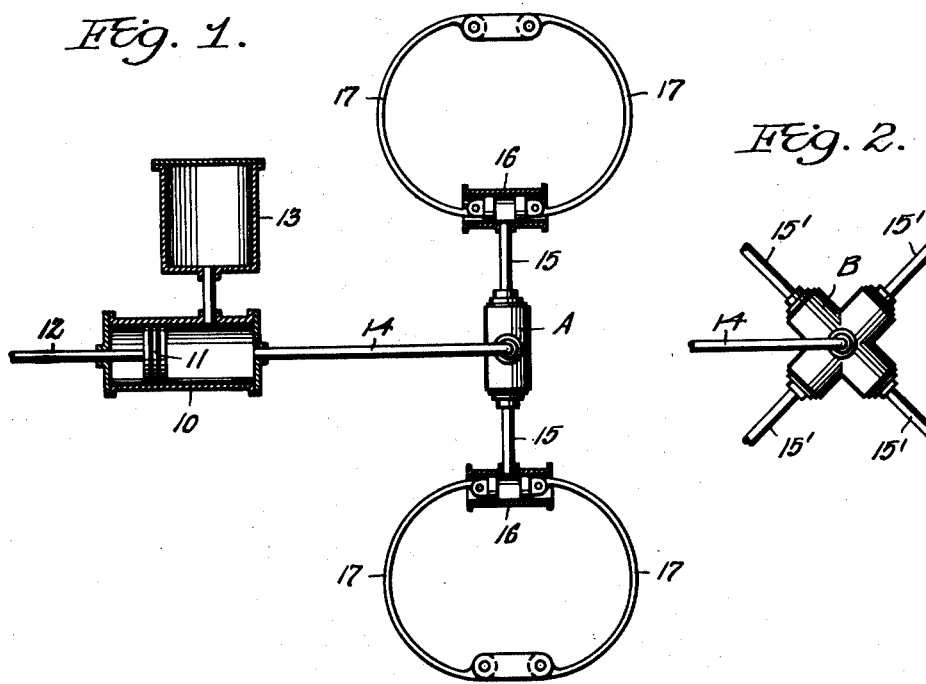
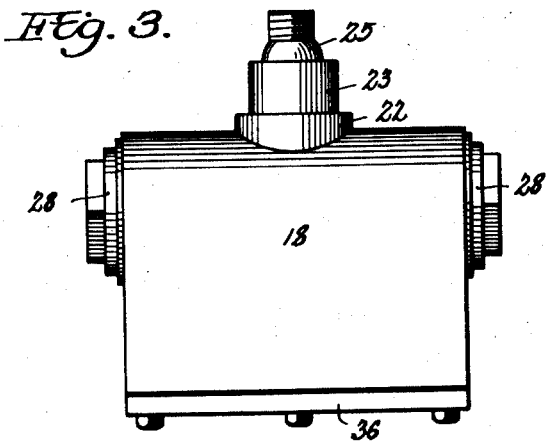
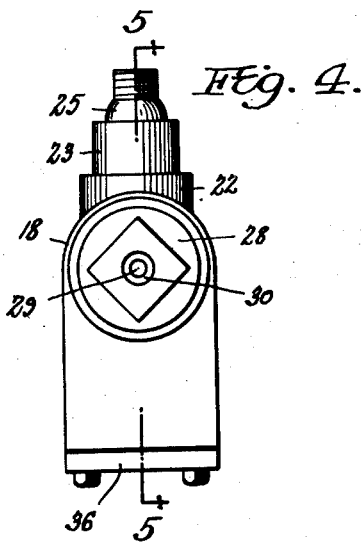
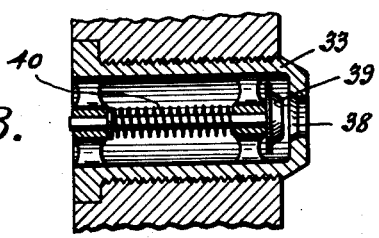
INVENTOR.
JULIAN E. NALL
BY
ATTORNEYS.

July 31, 1934.  J. E. NALL  1,968,702
HYDRAULIC BRAKE SAFETY DEVICE
Filed June 20, 1932   2 Sheets-Sheet 2
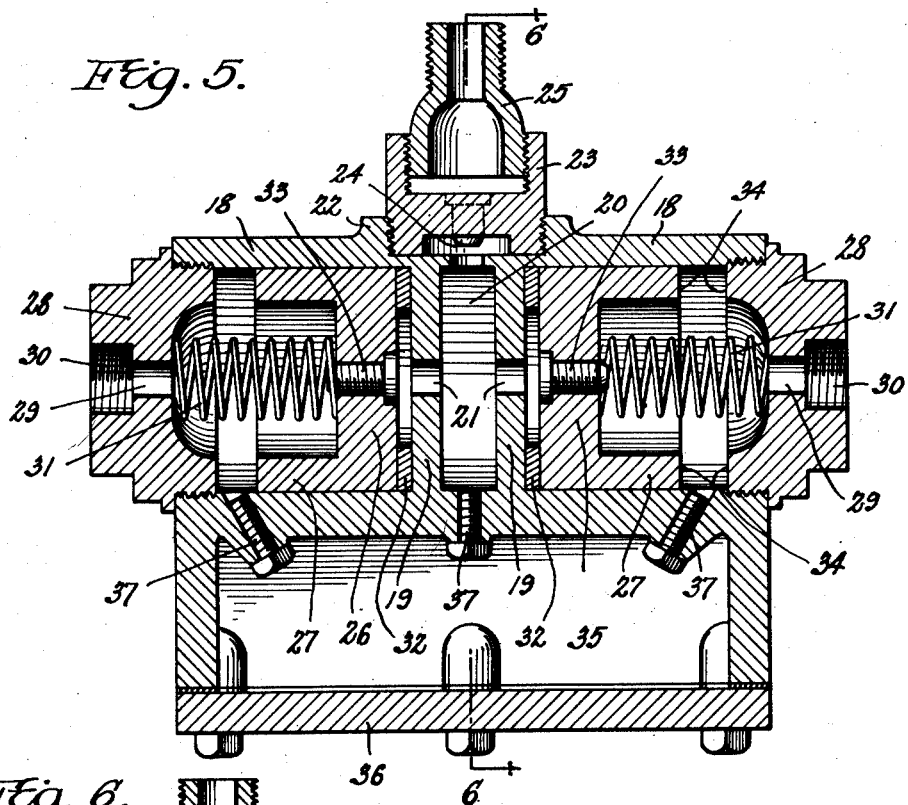
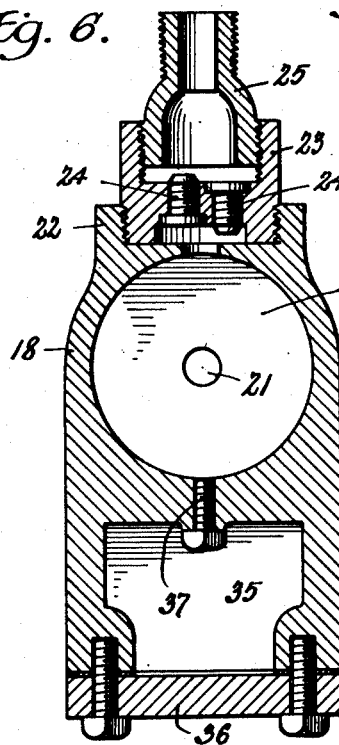
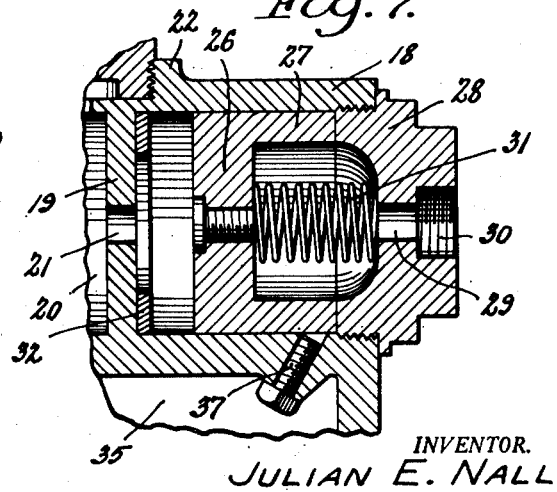
INVENTOR.
JULIAN E. NALL
BY
ATTORNEYS.

Patented July 31, 1934

1,968,702

UNITED STATES PATENT OFFICE 1,968,702

HYDRAULIC BRAKE SAFETY DEVICE

Julian E. Nall, Louisville, Ky.

Application June 20, 1932, Serial No. 618,357

2 Claims. (Cl. 303—84)

This invention relates to vehicle brakes and has special reference to hydraulic brakes.

In the use of hydraulic brakes difficulty has been experienced due to the fact that a leak in or breakage of a distributing pipe results in a total loss of braking power. Attempts have been made to overcome this loss but hitherto such attempts have been unsuccessful.

One important object of the invention is to provide a novel and improved means for so controlling the flow of fluid through the pipes of a hydraulic brake system that leakage in or breaking of one of the pipes leading to a wheel will result immediately in the broken or leaking pipe being immediately closed off from communication with the remaining pipes.

Certain of the prior arrangements for this purpose involve the use of a plunger or piston interposed between and entirely cutting off communication between two sections of a branch pipe, the plunger being forced by the pressure from the main cylinder to move toward the end of the pipe next the brake and the fluid between the plunger and the wheel being moved thereby to actuate the brake. The difficulty with such systems is that it is impossible, in practice, to ensure that the exact amount of fluid necessary for the proper operation of the brake is maintained in the pipe between the plunger and brake and no means exists for compensation of any minor leakages which do not affect the operation of the brake or of compensating for the volumetric changes due to variations in temperature.

A second important object of the invention is to provide a device utilizing such plungers but so arranged that while the brakes are out of operation communication exists between the two sides of each plunger, this communication being closed during brake operation. By this means any slight leakages will not affect the brake operation and the changes due to temperature will not interfere with proper braking.

A third important object of the invention is to provide a novel distributing head or manifold for use in connection with hydraulic brake systems, which head may be readily attached to existing hydraulic brake systems.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan in diagram showing a brake system including a manifold constructed in accordance with this invention as applied to a single pair of brakes.

Figure 2 is a plan of a portion of such a system with a modified form of manifold suitable for four wheel brakes.

Figure 3 is a side elevation of a two wheel brake manifold constructed in accordance with this invention.

Figure 4 is an end view thereof.

Figure 5 is an enlarged section on the line 5—5 of Figure 4 with the parts in brake releasing position.

Figure 6 is a section on the line 6—6 of Figure 5.

Figure 7 is a detail view of a portion of Figure 5 but with the parts in brake applied position.

Figure 8 is a greatly enlarged detail section taken through one of the check valves used in connection with the plungers herein.

In Figure 1 the general arrangement of the parts of brake system using this invention is disclosed. In this figure the main cylinder 10 is provided with the usual piston 11 having a rod 12 connected to a pedal lever (not shown) as is ordinarily the case in such devices. Also the usual main reservoir 13 communicates with the cylinder 10 and from the end of the cylinder 10 leads a main supply pipe 14 which connects with the intake of a manifold A. In this figure two pipes 15 which may be termed for convenience brake cylinder supply pipes, lead from this manifold. In Figure 2 the pipe 14 connects with a manifold B from which lead four brake cylinder supply pipes 15'. In each case each of the brake cylinder supply pipes is connected to a brake cylinder 16, here conventionally shown, for operating the brakes 17.

While the device has been shown in Figures 1 and 2 as applicable to a two wheel and a four wheel brake respectively, it has been shown in detail as arranged for a two wheel brake in order to simplify the disclosure and the arrangement for a four wheel brake being obvious from this disclosure. In these Figures 5 to 7 there is shown a manifold body including a pair of oppositely disposed cylinders 18 each having a head 19 at its inner end. The heads 19 are spaced to provide a central chamber 20. Moreover, each cylinder communicates with the chamber 20 through a port 21 formed centrally of the respective head. Above the chamber 20 the body is provided with a hollow boss 22 internally threaded to receive the valve body 23 which is provided with the check valves 24. A reducing coupling 25 is screwed in the valve body so that the main supply pipe 14 may be connected to the manifold.

In each of the cylinders is slidably mounted a piston 26 having a skirt 27, these skirts being directed away from the cylinder heads 19. Screwed into the open end of each cylinder is a head 28 having a central port 29 communicating with a pipe threaded socket 30 to which is connected a respective pipe 15. Between each head 28 and the respective piston 26 is a spring 31 which normally holds the piston against a spacer ring 32 interposed between the piston and the respective head 19. It is to be noted that the thickness of this ring 32 determines the brake release position of the piston or plunger 26 and that, by the use of a desired thickness of ring the piston may be varied in position to suit the conditions. Thus the individual brakes may be adjusted by selecting proper thicknesses of rings. Obviously this is so since the thicker the ring the less will be the movement before the piston seats against the head so that, similarly, the less will be the movement of the brake itself. In the head of each piston there is fitted a check valve opening towards the chamber 20, the body or casing of the valve being shown at 33. Each head 28 and the corresponding skirt are provided with seat surfaces 34 which contact to form a fluid tight seat upon the piston being forced outwardly of its cylinder.

Beneath the cylinders 18 the body is provided with an auxiliary reservoir 35 closed by a head 36 and this reservoir communicates with the chamber 20 and with the outer ends of the cylinders through ports normally closed by the screw plugs 37.

In Figure 8 is shown a form of check valve which may be used herewith, the view merely showing a typical form of such a valve and it being understood that any suitable form of check valve may be used for this purpose. In the form showing the casing 33 has a seat 38 for a valve disk 39 normally held open by a light spring 40.

In operation the brakes are set by movement of the piston 11 to the right in Figure 1. This forces some of the fluid with which system is filled into the chamber 20 from whence it flows through the ports 21 into the cylinders 18. The check valves, being only held open by light springs, close and the pistons 26 become in effect solid pistons which move outwardly in their respective cylinders and force the fluid through the pipes 15 into the brake cylinders 16 thus setting the brakes. If one of the pipes 15 breaks or an injurious leak exists in the line the release of pressure on this part of the system will at once cause closing of the check valve and movement of the respective piston to seat on the head 28 and thereby prevent loss of any brake fluid to an extent greater than that sufficient to permit such piston movement. Thus the remainder of the system will be unaffected. If a slight leak occurs, such as would not affect normal operation, enough fluid will flow through the check valve to maintain the line in full condition beyond the respective piston. Also, the fact that the check valve is normally open permits those variations in the fluid due to temperature changes.

It will be understood that the check valves 24, one of which opens in one direction and the other in the opposite direction, are normally both held closed. These check valves do not open in either direction except during operation of the brakes when more than the pressure due to gravity of the fluid is exerted. Because of this any leakage will be additionally checked at this point since such leakage will be merely dependent on the gravity flow of the liquid.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what I claim as new, is:

1. In a device of the kind described, a manifold body having a central chamber and a plurality of cylinders extending from said chamber and each in port communication with the chamber, means to supply fluid under pressure to said chamber, a piston in each of said cylinders having a head provided with a check valve opening toward the chamber, a head on each cylinder having means for connecting a brake cylinder pipe thereto, a spring between each head and the respective piston urging the piston toward the chamber, and a removable and replaceable spacer ring at the inner end of each cylinder forming a limit means for limiting movement of the respective piston towards the chamber whereby to limit the amount of pressure fluid discharged from the respective cylinders and thereby to control the forces for applying respective brakes.

2. In a device of the kind described, a manifold body having a central chamber and a plurality of cylinders extending from said chamber and each in port communication with the chamber, means to supply fluid under pressure to said chamber, a piston in each of said cylinders having a head provided with a check valve opening toward the chamber, a head on each cylinder having means for connecting a brake cylinder pipe thereto, a spring between each cylinder head and the respective piston urging the piston toward the chamber, a removable and replaceable spacer ring at the inner end of each cylinder forming a limit means for limiting movement of the respective piston towards the chamber whereby to limit the amount of pressure fluid discharged from the respective cylinders and thereby to control the forces for applying respective brakes, and a skirt on each piston directed towards the respective cylinder head, said skirt and cylinder head being provided with cooperating contact surfaces to form a fluid tight joint between the piston and cylinder head.

JULIAN E. NALL.